United States Patent
Kobayashi

Patent Number: 5,517,550
Date of Patent: May 14, 1996

[54] ISDN SWITCHING APPARATUS

[75] Inventor: Hideharu Kobayashi, Tokyo, Japan

[73] Assignee: NEC Corporation, Tokyo, Japan

[21] Appl. No.: 184,054

[22] Filed: Jan. 21, 1994

[30] Foreign Application Priority Data

Jan. 22, 1993 [JP] Japan .................................. 5-026056

[51] Int. Cl.$^6$ ................................................ H04N 11/00
[52] U.S. Cl. .............................. 379/58; 379/60; 379/63; 379/94
[58] Field of Search .................... 379/58, 59, 63, 379/60, 94, 93

[56] References Cited

U.S. PATENT DOCUMENTS

| | | | |
|---|---|---|---|
| 4,680,786 | 7/1987 | Baker et al. .............................. | 379/60 |
| 5,297,193 | 3/1994 | Bouix et al. .............................. | 379/63 |
| 5,325,419 | 6/1994 | Connolly et al. ......................... | 379/59 |

*Primary Examiner*—Scott A. Rogers
*Assistant Examiner*—Fan Lee
*Attorney, Agent, or Firm*—Foley & Lardner

[57] ABSTRACT

An ISDN switching apparatus for performing an ISDN local connection includes a digital switch, a first terminal and a second terminal connected by a juncture external to the digital switch. A network control device performs interface control for the public network. The network control device is located between the digital switch and the public network. A terminal device controls a fixed terminal device such as an ISDN terminal. A first connection device performs a connection control of the digital switch for the terminal control device. A mobile terminal control device controls a mobile terminal, and a second connection device controls the digital switch for the mobile terminal control device such that when transmitting from the mobile terminal to the public network, the mobile terminal control device and the second terminal are connected by the digital switch via the second connection device, and the first terminal and the network control device are connected by the digital switch via the first connection device.

5 Claims, 4 Drawing Sheets

ISDN SWITCHING APPARATUS

BACKGROUND OF THE INVENTION

The present invention relates to an ISDN switching apparatus for causing an ISDN switching unit for an existing local switch (LS) to efficiently provide mobile communication services.

In order to add a mobile communication function to a conventional LS ISDN switching unit which incorporates analog telephone sets and ISDN terminals to establish connections with an ISDN or analog network, switching control of a digital switch inherent to the mobile communication services is required during movement of a mobile terminal. In a conventional apparatus, such a switching controller is developed independently of the switching unit.

Although this conventional apparatus has a functionally overlapping portion, the existing ISDN resources cannot be properly utilized to result in an increase in developing steps and maintenance and management expenses.

SUMMARY OF THE INVENTION

The present invention has been made in consideration of the above situation, and has as its object to utilize an overlapping portion as much as possible.

In order to achieve the above object of the present invention, there is provided an ISDN switching apparatus for performing an ISDN local connection, comprising local connecting means for a local connection and mobile terminal connecting means for a mobile terminal connection, wherein the local connecting means is connected to the mobile terminal connecting means through a path in a connection between a local subscriber side and a mobile terminal subscriber side.

When the second connecting means receives a connection request from a mobile terminal through the second terminal control means or a connection request to the mobile terminal through a first network control means, the second connecting means connects a second terminal to the radio base station through a path in the digital switch.

A public network is connected to a first terminal through the first connecting means and a path in the digital switch in accordance with a CCITT No. 7 signal scheme. In addition, when the second release means receives a release request from the mobile terminal through the second terminal control means or a release request from the public network through the first network control means, the second release means releases the path of the digital switch which connects the second terminal to the radio base station. At the same time, the second release means releases, through the first release means, the path of the digital switch which connects the public network to the first terminal.

DESCRIPTION OF THE PREFERRED EMBODIMENT

Figure 1:
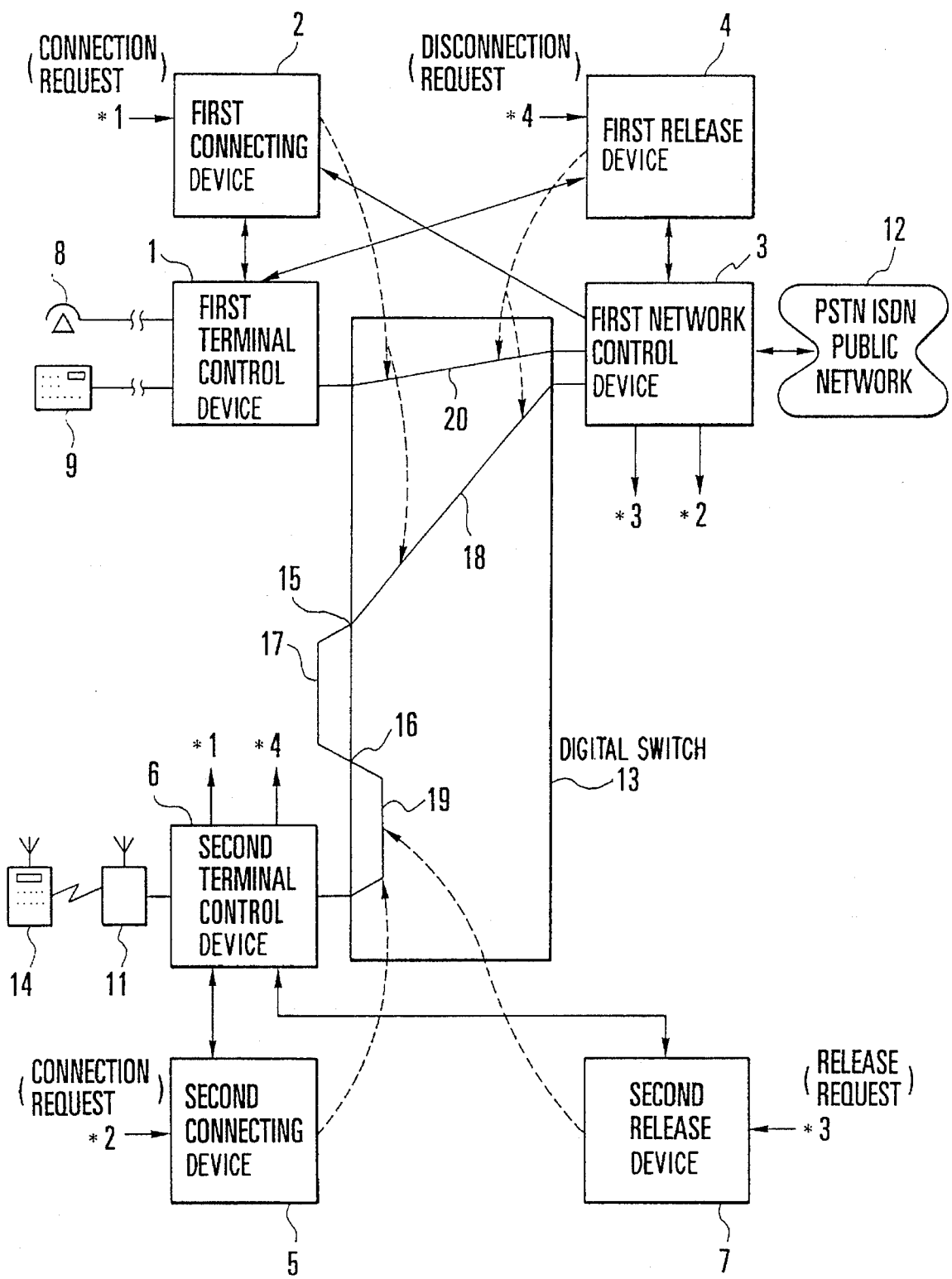
FIG. 1 is a block diagram showing an arrangement according to an embodiment of the present invention.

FIG. 1 shows an apparatus to which the present invention is applied according to an embodiment. This apparatus connects connection terminals such as an analog telephone set 8 and an ISDN terminal 9 through a first terminal control device 1 connected to the input of a digital switch 13. The input of the digital switch 13 is coupled to a mobile terminal 14 through a second terminal control device 6 and a radio base station 11.

A first terminal 15 and a second terminal 16 on the input side of the digital switch 13 are connected through a folded line 17. The output of the digital switch 13 is connected to a first network control device 3. The first terminal control device 1 controls the connection terminals, and the first network control device 3 controls the public network 12.

Connection requests from the first terminal control device 1 and the second terminal control device 6 through the first network control device 3 are supplied to a first connecting device 2. The first connecting device 2 is adapted to receive a connection request from a connection terminal through the first terminal control device 1, a connection request from the mobile terminal 14 through the second terminal control device 6, or a connection request to a connection terminal or the mobile terminal through the first network control device 3.

Upon reception of such a connection request, when a connection destination is a connection terminal, the first connecting device 2 connects the connection terminal to a public network 12 through the first terminal control device 1, the first network control device 3, and a path 20 of the switch 13, thereby setting a first speech communication state in accordance with the first predetermined protocol, e.g., the No. 7 signal scheme as a standard CCITT signal scheme.

However, if the connection destination is the mobile terminal 14, the first connecting device 2 connects the public network 12 to the first terminal 15 through the first network control device 3 and a path 18 of the digital switch 13, thereby setting a second speech communication state.

The second terminal control device 6 controls the mobile terminal 14 through the radio base station 11. Upon reception of a connection request from the mobile terminal 14 through the second terminal control device 6 or a connection request to the mobile station 14 through the first network control device 3, a second connecting device 5 sets the mobile terminal 14 in a communication state through the second terminal control device 6 and the radio base station 11 in accordance with the third predetermined protocol such as an ISDN user.network protocol.

Upon reception of a release request from the public network 12 through the first network control device 3, a release request from the connection terminal through the first terminal control device 1, or a release request from the mobile terminal 14 through the second terminal control device 6, a first release device 4 performs release control in accordance with the second predetermined protocol, e.g., the No. 7 signal scheme.

In the first speech communication state, the path 20 in the digital switch 13 which connects the public network 12 to the connection terminal through the first terminal control device 1 and the first network control device 3 is released. In the second speech communication state, the path 18 in the digital switch 13 which connects the public network 12 to a first terminal 15 is released.

Upon reception of a release request from the mobile terminal 14 through the second terminal control device 6 or a release request from the public network 12 through the first network control device 3 in the second speech communication state, a second release device 7 releases a path 19 of the switch 13 which connects a second terminal 16 to the radio base station 11 in accordance with the fourth predetermined protocol, e.g., the ISDN user.network protocol, and sets the mobile terminal 14 in a released state through the second terminal control device 6 and the radio base station 11.

Figure 2:
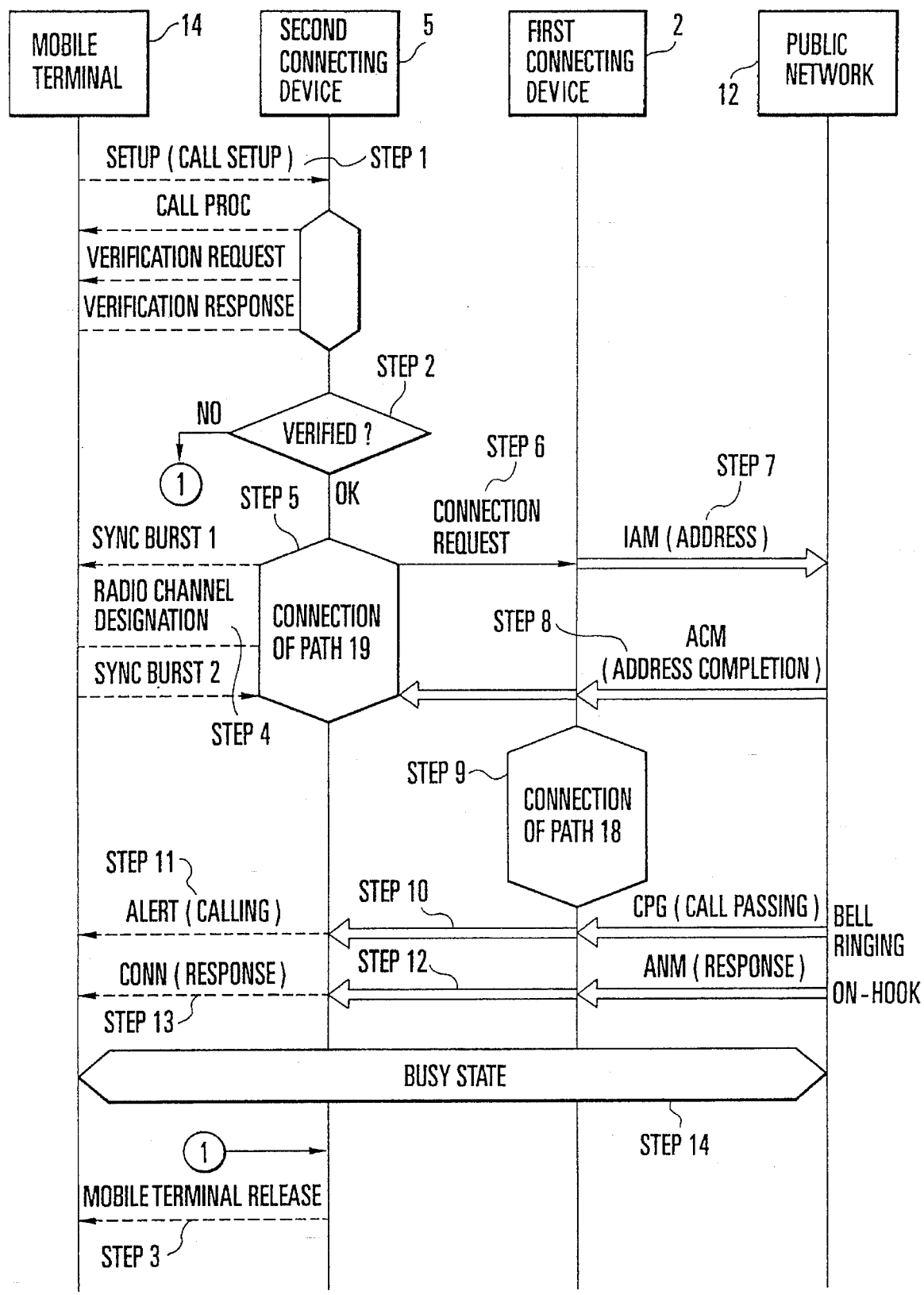
FIG. 2 is a flow chart showing connection operations from calling to a busy state.
Figure 3:
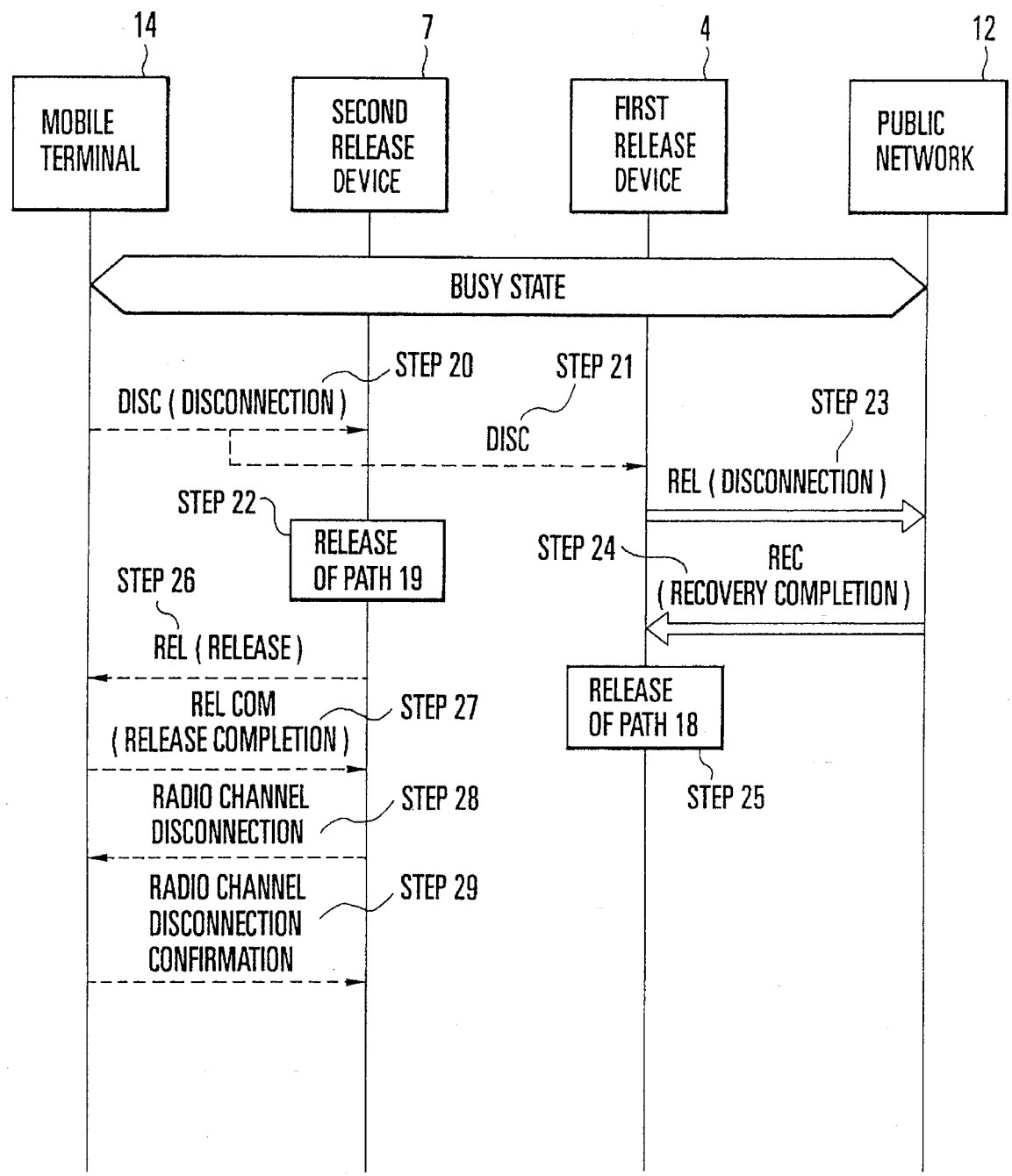
FIG. 3 is a flow chart showing operations from reception of a disconnection signal from a calling party to completion of the disconnection.
Figure 4:
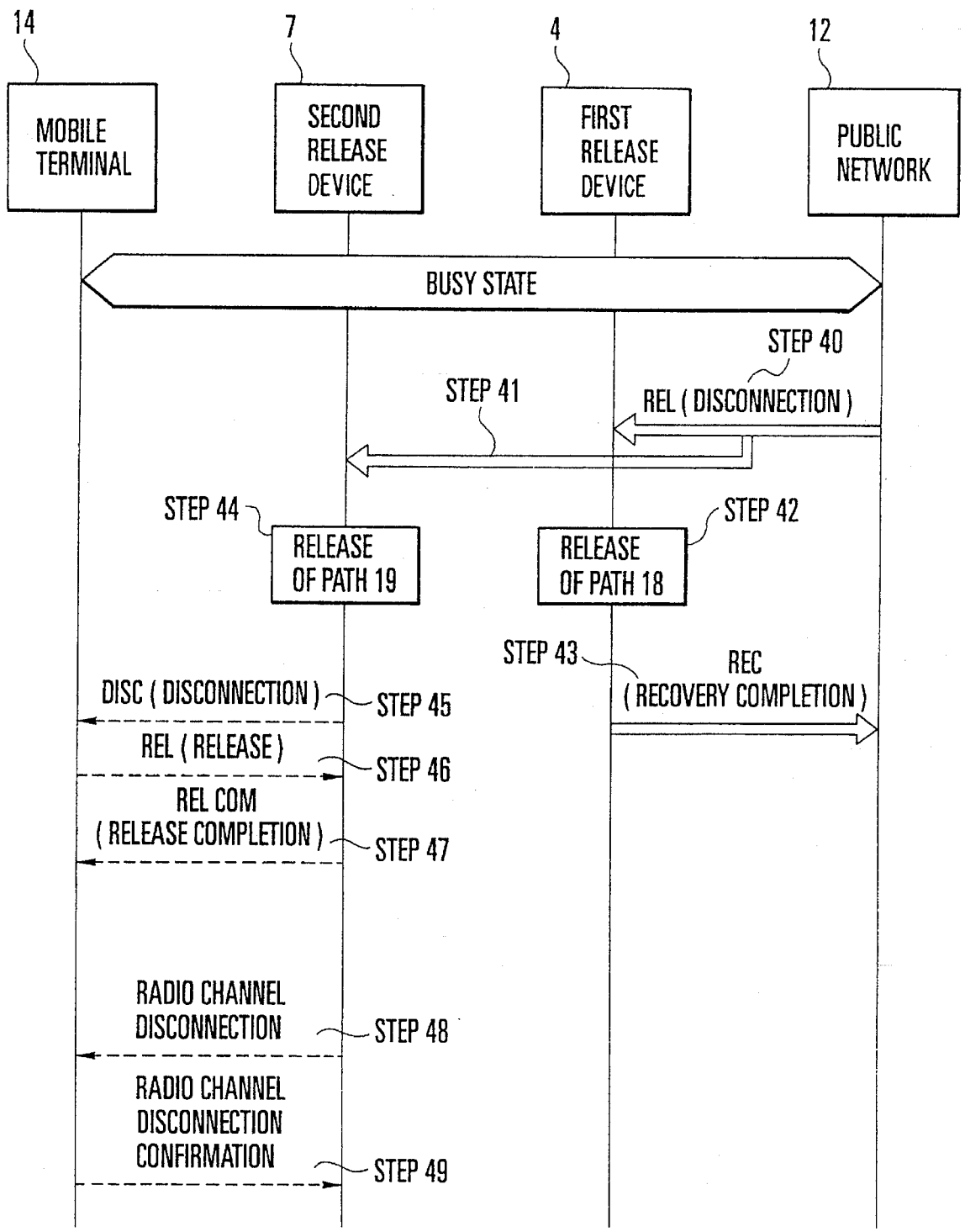
FIG. 4 is a flow chart showing a flow from reception of a disconnection signal from a call destination to completion of the disconnection.

Operations performed upon outputting a connection request from the mobile terminal 14 will be described with reference to the flow charts in FIGS. 2, 3, and 4.

Connection operations from calling to the busy state will be described with reference to FIG. 2. Upon reception of call setup from the mobile terminal 14 through the second connecting means 6 (step 1), the mobile terminal 14 is verified using a database (not shown) (step 2).

If the mobile terminal 14 cannot be verified, a path is released (step 3). Otherwise, an appropriate radio channel is selected (step 4), the path 19 in the digital switch 13 is connected (step 5), and a connection request is output to the first connecting device 2 (step 6).

Upon reception of the request, the first connecting device 2 sends an IAM (address) signal to a call destination through the public network 12 (step 7). Upon reception of an ACM (address completion) signal through the public network 12 (step 8), the first connecting device 2 connects the path 18 in the digital switch 13 (step 9).

Upon reception of a CPG (call passing) signal serving as a bell ringing signal from the call destination through the first connecting device 2 (step 10), the second connecting device 5 outputs an ALERT (calling) signal to the mobile terminal 14 (step 11) and outputs a ringing tone. Upon reception of an ANM (response) signal serving as an off-hook signal from the call destination through the first connecting device 2 (step 12), the second connecting device 5 outputs a CONN (response) signal to the mobile terminal 14 (step 13) and sets the mobile station 14 in a busy state (step 14).

Operations from reception of a disconnection signal from the calling party to the completion of the disconnection will be described with reference to FIG. 3. Upon reception of a DISC (disconnection) signal from the mobile terminal 14 through the second terminal control device 6 and the radio base station 11 (step 20), the second release device 7 releases the path 19 in the digital switch 13 (step 22).

Upon reception of the DISC (disconnection) signal through the second terminal control device 6 (step 21), the first release device 4 outputs an REL (disconnection) signal to the call destination through the public network 12 (step 23). Upon reception of an REC (recovery completion) signal from the call destination (step 24), the first release device 4 releases the path 18 in the digital switch 13 (step 25).

On the other hand, upon release of the path 19, the second release device 7 outputs an REL (release) signal to the mobile terminal 14 (step 26). Upon reception of an REL-COM (release completion) signal from the mobile terminal 14 (step 27), the second release device 7 outputs a radio channel disconnection signal (step 28) and receives a radio channel disconnection confirmation signal (step 29), thereby completing disconnection processing.

Operations from reception of a disconnection signal from the call destination to the completion of disconnection will be described with reference to FIG. 4. Upon reception of an REL (disconnection) signal from the call destination through the first network control device 3 and the public network 12 (step 40), the first release device 4 releases the path 18 in the digital switch 13 (step 42) and sends an RLC (recovery completion) signal to the call destination (step 43).

On the other hand, upon reception of an REL (disconnection) signal through the first network control device 3, the second release means 7 releases the path 19 (step 44) and outputs a DISC (disconnection) signal to the mobile terminal 14 (step 45). The second release device 7 then receives an REL (release) signal (step 46), outputs an RELCOM (release completion) signal (step 47), disconnects the radio channel (step 48), and receives the radio channel disconnection confirmation signal (step 49), thereby completing the disconnection processing.

In this manner, when path connection/release is performed such that selection of a radio zone upon movement of the mobile terminal and switching processing of the path 19 upon movement of the mobile terminal are performed under the control of the second connecting device 5, independent control operations can be performed. Therefore, incoming call processing can be performed independently of general call processing such as connection processing.

As has been described above, according to the present invention, in mobile communication services in an LS station, a folded path is arranged outside a digital switch, one terminal of the folded path is used to connect a call destination, and the other terminal of the folded path is used to connect the mobile terminal. Processing inherent to mobile terminal control such as switching of a switch path upon switching a radio channel can be separately performed from connection processing for the call destination. Conventional ISDN switching call processing can be used with little modifications in connection processing for the call destination. Therefore, the developing steps and the maintenance and management expenses can be greatly reduced.

What is claimed is:

1. An ISDN switching apparatus for performing an ISDN local connection, comprising:

a digital switch;

a first terminal and a second terminal connected by a juncture external to said digital switch;

a network control device performing an interface control for a public network, said network control device located between said digital switch and said public network;

a terminal control device controlling a fixed terminal device;

a first connection device performing a connection control of said digital switch for said terminal control device;

a mobile terminal control device controlling a mobile terminal; and a second connection device performing connection control of said digital switch for said mobile terminal control device, wherein, at a time of transmitting from said mobile terminal to said public network, said mobile terminal control device and said second terminal are connected by said digital switch via said second connection device, and said first terminal and said network control device are connected by said digital switch via said first connection device.

2. An ISDN switching apparatus of claim 1, wherein said network control device identifies whether a call destination is said fixed terminal or said mobile terminal at a time of receiving a transmission from said public network, so that said network control device and said terminal control device are connected by said digital switch via said first connection device if said call destination is said fixed terminal; and said first terminal and said network control device are connected by said digital switch via said first connection device if said call destination is said mobile terminal; and said mobile terminal control device and said second terminal are connected by said digital switch via said second connection device.

3. An ISDN switching apparatus of claim 1, wherein said fixed terminal device is one of an ISDN terminal and an analog telephone set.

4. An ISDN switching apparatus of claim 1, wherein said public network is a public switched ISDN telephone network.

5. An ISDN switching apparatus for performing an ISDN local connection, comprising:

- a digital switch having a first input terminal and a second input terminal, said first and second input terminals being connected by a juncture external to said digital switch;
- a network control device performing an interface control for a public network, said network control device located between said digital switch and said public network;
- a terminal control device controlling a fixed terminal device;
- a first connection device performing a connection control of said digital switch for said terminal control device based on a connection request received by said first connection device;
- a mobile terminal control device controlling a mobile terminal;
- a second connection device performing connection control of said digital switch for said mobile terminal control device based on said connection request received by said second connection device;

wherein, when said connection request signifies that a connection destination is said fixed terminal device, said fixed terminal device and said public network are connected by said digital switch via said first connection device and said network control device, such that a first communications path is established between said fixed terminal device and said public network, and when said connection request signifies that said connection destination is said mobile terminal, said public network is connected to the first input terminal by said first connection device, and the second input terminal is connected to said mobile terminal control device by said second connection device, such that a second communications path is established between said mobile terminal and said public network via said digital switch, said juncture, and the first and second input terminals.

\* \* \* \* \*